United States Patent Office 3,351,599
Patented Nov. 7, 1967

3,351,599
10,11-DIHYDRO DIBENZO[b,f]THIEPINS
Miroslav Protiva, Jiří Jílek, Jiřina Metyšová, Ivan Ernest, Karel Pelz, and Edita Adlerová, Prague, Czechoslovakia, assignors to SPOFA, Spojené podniky pro zdravotnickou vyrobu, Prague, Czechoslovakia
No Drawing. Filed Dec. 28, 1965, Ser. No. 517,102
Claims priority, application Czechoslovakia, Dec. 31, 1964, 7,437/64
5 Claims. (Cl. 260—268)

The invention relates to new heterocyclic compounds and salts thereof, and to a method of preparing them. The general Formula I of the compounds is:

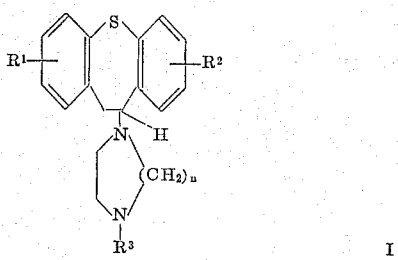

wherein the substituents $R^1$ and $R^2$, identical or different, stand for a hydrogen atom or a halogen atom, whereat at least one of said substituents is other than hydrogen, the substituent $R^3$ stands for a hydrogen atom, or alkyl or hydroxyalkyl with 1–6 carbon atoms, and $n=2$ or 3.

The new heterocyclic compounds of the above cited general formula and their salts are noted for an extraordinary pharmacodynamical activity, and can be designated as a new group of multipotent neurotropic and psychotropic substances. In the first line they are prominent by a high central sedative effect, shown in the usual pharmacological tests, especially in the rotating rod test and in the thiopental narcosis potentiation test. Besides they show a high degree of antihistamine effect and antiserotonine activity. At the same time they are considerably effective analgetics, and show besides a hypothermic and anticmetic effect. The quaternary salts derived thereof are in addition anticholinergics and ganglioplegics. Owing to all these qualities, the substances of the general Formula I are therapeutically applicable in various directions and indications.

According to the invention, substances of the general Formula I are prepared in the way that esters of secondary alcohols of the general Formula II.

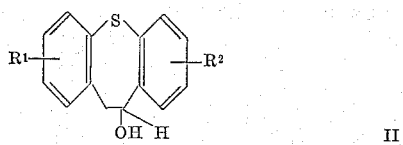

wherein the substituents $R^1$ and $R^2$ have the same signification as in the Formula I, with inorganic acids, in particular hydrogen halide acids, or esters with alkane- and arenesulfonic acids are reacted with diamines of the general Formula III:

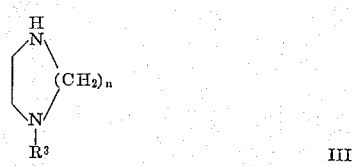

wherein $R^3$ and $n$ have the same signification as in the Formula I, whereupon the products thus obtained are converted to salts by neutralization with inorganic or organic acids.

In carrying out the preparation process according to the invention, it can be operated, for example, in the manner that the reaction components are heated to a temperature of about 100° either without any medium, or in the medium of a suitable organic solvent, such as ethers, alcohols, or aromatic hydrocarbons, or as the case may be, in the presence of alkaline condensation agents, such as potassium or sodium carbonates, pyridine, triethyl amine, etc. The isolation of the products is based on their basical character. Some of them are distillable at reduced presure without decomposition. All of them, by neutralization with inorganic or organic acids, give salts that are water-soluble and suitable for preparing medicine forms.

The details of the preparation method according to the invention may be evident from the following examples, wherein also the way of preparing the requisite starting and intermediate substances is outlined, which products, by the major part, are also new or yet undescribed substances. The operational temperatures and melting points throughout the description and examples are quoted in centigrades.

EXAMPLES (1) *8-chloro-10-(4-methylpiperazine)-10,11-dihydrodibenzo-(b,f)thiepin*

A mixture of 10.0 g. of 8,10-dichloro-10,11-dihydrodibenzene(b,f)thiepin (M.P. 105–106°) and 20.0 g. of 1-methylpiperazine is heated to 100–130° for 2 hours. After partial cooling it is distributed by stirring between benzene (300 ml.) and water (300 ml.) and the benzene layer is shaken with 3 N hydrochloric acid (500 ml.). The eliminated hydrochloride of 8-chloro-10-(4-methylpiperazine)-10,11-dihydrodibenzo(b,f)thiepin is filtered off by suction. There are obtained 8.0 g. of a substance, which after recrystallization from water has M.P. 130–135°. In accordance with the analysis, it is the matter of a monohydrochloride-monohydrate of the formula $C_{19}H_{24}Cl_2N_2OS$. By alkalizing the aqueous solution of the said hydrochloride with concentrated ammonia the base with M.P. 99–100° (dilute ethanol) is obtained. Neutralizing this base with excess 3 N hydrochloric acid, and by recrystallization of the eliminated product from boiling 1 N hydrochloric acid the anhydrous dihydrochloride $C_{19}H_{23}Cl_3N_2S$ with M.P. 230° (thawing from 190°) is obtained.

When starting 8,10-dichloro-10,11-dihydrodibenzo(b,f) thiepin is prepared by the following sequence of operations from 4'-chlorodiphenylsulfide-2-carboxylic acid:

To a suspension of 2.5 g. lithium-aluminium hydride in 50 ml. ether a suspension of 13.2 g. of 4'-chlorodiphenylsulfide-2-carboxylic acid in 200 ml. ether is added with stirring. The mixture is heated to the boil under reflux for 7 hours, cooled down and decomposed with water and dilute hydrochloric acid: the ethereous layer is washed with a 10%-soda solution, dried, and evaporated. By distillation there are obtained 8.7 g. of o-(4-chlorophenylthio)benzyl alcohol with B.P. 182/0.7 torr. To a mixture of 8.0 g. of the latter alcohol and 3.0 g. anhyd. pyridine, 4.3 g. thionyl chloride is dropwise added with cooling and stirring. It is stirred for 2 hours at room temperature, left at rest for 12 hours, and then distributed between water and ether. The ethereous layer is washed with 1 N hydrochloric acid, 10%-soda solution, and water. After drying and evaporating the ether, there is obtained 7.9 g. of o-(4-chlorophenylthio)benzyl chloride with B.P. 162–164°/0.5 torr, which becomes crystalline solidified, and after recrystallization from ethanol has M.P. 46–47°.

To a solution of 3.2 g. sodium cyanide in 5 ml. water a solution of 13.4 g. of o-(4-chlorophenylthio)benzyl chloride in 15 ml. ethanol is added, and the mixture is boiled under reflux for 8 hours. Ethanol is distilled off, and the residue is diluted with 50 ml. water, and the product extracted into 50 ml. benzene. The benzeneous solution is washed with water, dried, and evaporated. The residue (13.0 g.) represents o-(4-chlorophenylthio)-benzyl cyanide with M.P. 63–64° (ether-petroleum ether).

To a solution of 12.0 g. of the latter cyanide in 40 ml. ethanol a solution of 11.5 g. potassium hydroxide in 25 ml. water is added, and the mixture heated to the boil under reflux with stirring for 5 hours. Ethanol is evaporated, the residue diluted with 150 ml. water, and the solution is washed with ether. The aqueous alkaline solution is acidified with 3 N hydrochloric acid. There are obtained 10.6 g. of 4′-chlorodiphenylsulfide-2-acetic acid with M.P. 116° (aqueous ethanol).

A mixture of 5.0 g. of the latter acid and 20 g. polyphosphoric acid is heated with stirring for 1 hour to 125–130°. On partial cooling it is diluted with 100 ml. water, and the product eliminated is extracted into benzene. The extract is washed with a 5%-sodium hydroxide solution, dried with anhydr. potash, and evaporated. There are obtained 4.10 g. of 8-chloro-10,11-dihydrodibenzo(b,f)-thiepin-10-on with M.P. 125–126° (ethanol).

A solution of 3.0 g. of 8-chloro-10,11-dihydrodibenzo-(b,f)thiepin-10-on in 60 ml. ethanol is reduced by addition of a solution of 1.5 g. sodium borohydride in 7.5 ml. water (with addition of a sodium hydroxide granule). The mixture is stirred and heated to the boil under reflux for 2 hours, is then evaporated, the residue diluted with 100 ml. water, and extracted with benzene. The extract is washed with 1 N hydrochloric acid, dried with anhydr. potash, and evaporated. There are obtained 3.0 g. of 8 - chloro - 10,11 - dihydrodibenzo(b,f)thiepin-10-ol, with M.P. 84–85° (ether-petroleum ether).

2.0 g. of the latter alcohol is dissolved in 5 ml. thionyl chloride, and the solution left at rest for 12 hours, then it is heated to the boil under reflux for 1 hour, diluted with benzene, and evaporated in vacuo to dryness. The residue is recrystallized from cyclohexane. There is obtained 1.30 g. of 8,10-dichloro-10,11-dihydrodibenzo-(b,f)thiepin, with M.P. 105–106°, which is the starting product for preparing the title substance of this Example 1.

(2) *2-chloro-10-(4 - methylpiperazine) - 10,11 - dihydrodibenzo(b,f)thiepin*

A mixture of 15.7 g. of 2,10-dichloro-10,11-dihydrodibenzo(b,f)thiepin and 30.0 g. of 1-methylpiperazine is heated to 115–120° for 3.5 hours. After cooling it is distributed by shaking between 200 ml. benzene and 200 ml. water. The benzeneous layer is separated and is shaken with 200 ml. of 3 N HCl; there is eliminated the crystalline hydrochloride, which is sucked off and suspended in 100 ml. water. To this suspension 100 ml. benzene is added in layer, and the base is liberated by addition of a 20%-NaOH solution. By distilling off the benzene in vacuo there are obtained 11.3 g. of the crude base 2 - chloro - 10 - (4 - methylpiperazine) - 10,11 - dihydrodibenzo(b,f)thiepin. This base is dissolved in ethanol, and by addition of the equivalent quantity of maleic acid is converted to the crystalline maleste, with M.P. 170–171°.

The starting substance 2,10-dichloro-10,11-dihydrodibenzo(b,f)thiepin, with M.P. 122–124°, is prepared from 5-chloroanthranilic acid via 2-iodo-5-chlorobenzoic acid (M.P. 165–166°), 2-phenylthio-5-chlorobenzoic acid (M.P. 166–167°), 2-phenylthio-5-chlorobenzyl alcohol (M.P. 57–58°), 2-phenylthio-5-chlorobenzyl chloride (B.P. 176–8°/0.3 torr), 2-phenylthio - 5 - chlorobenzyl cyanide (B.P. 199–206°/1.5 torr), 2-phenylthio - 5 - chlorophenylacetic acid (M.P. 118–120°), which is cyclized with polyphosphoric acid to give 2-chloro-10,11-dihydrodibenzo(b,f)thiepin-10-on (M.P. 141–143°), 2-chloro-10,11-dihydrodibenzo(b,f)thiepin - 10 - ol (M.P. 106.5–107.5°), giving with dry hydrogen chloride the desired starting substance, the 2,10-dichloro-10,11-dihydrobenzo-(b,f)thiepin, with M.P. 122–124°.

(3) *3-chloro-10-(4 - methylpiperazine) - 10,11 - dihydrodibenzo(b,f)thiepin*

A mixture of 4.5 g. of 3,10-dichloro-10,11-dihydrodibenzo(b,f)thiepin and 9.0 g. of 1-methylpiperazine is heated to 125° for 2 hours. After cooling it is distributed by shaking between benzene and water; the benzeneous layer is shaken with 40 ml. dilute hydrochloric acid (7.5 ml. 5 N HCl and 32.5 ml. water), and the hydrochloride extracted is sucked off and washed with benzene. The salt thus obtained is suspended in water, and by addition of a 20%-sodium hydroxide solution the base is liberated, which is extracted into benzene. After evaporation of the latter there remains the crude base 3-chloro-10-(4-methylpiperazino)-10,11-dihydrodibenzo(b,f)thiepin, which is converted to maleste by action of an equivalent quantity maleic acid in the medium of ethanol and ether. After recrystallization from ethanol and ether, the maleste has M.P. 156–158°.

The starting 3,10-dichloro-10,11-dihydrodibenzo(b,f)-thiepin (M.P. 106–8°) is prepared from 2-nitro-4-chlorotoluene by a sequence of operations via: 2-nitro-4-chlorobenzoic acid (M.P. 138°), 4-chloroanthranilic acid (M.P. 233–4°), 2-iodo-4-chlorobenzoic acid (M.P. 161–3°), 2-phenylthio-4-chloro-benzoic acid (M.P. 219–221°), 2-phenylthio-4-chlorobenzyl alcohol (M.P. 86–7°), 2-phenylthio-4-chlorobenzyl chloride (M.P. 49–51°), 2-phenylthio-4-chlorobenzyl cyanide (M.P. 55–7°), 2-phenylthio-4-chlorophenylacetic acid (M.P. 143–146°), which is cyclized with polyphosphoric acid to 3-chloro-10,11-dihydrodibenzo(b,f) thiepin-10-on (M.P. 148–150°), and forth via 3-chloro-10,11-dihydrodibenzo(b,f)thiepin-10-ol (M.P. 105–107°) to the desired substance 3,10-dichloro-10,11-dihydrodibenzo(b,f) thiepin (M.P. 106–8° benzene-petroleum ether).

(4) *4-chloro-10-(4-methylpiperazino) - 10,11 - dihydrodibenzo(b,f)thiepin*

A mixture of 6.5 g. of 4,10-dichloro-10,11-dihydrodibenzo(b,f)thiepin and 13 ml. of 1-methylpiperazine is heated to 110° for 2 hours. After cooling it is processed analogically to the preceding example. There are obtained 4.3 g. of crystalline base 4-chloro-10-(4-methylpiperazine)-10,11-dihydrodibenzo(b,f)thiepin with M.P. 113–115°. Of this base, by action of the equivalent quantity maleic acid in the medium of ethanol and ether, the crystalline maleste with M.P. 186–188° is prepared.

The starting 4,10-dichloro-10,11-dihydrodibenzo(b,f) thiepin is prepared of 2-iodo-3-nitrobenzoic acid by an operational sequence via: 2-phenylthio-3-nitrobenzoic acid (M.P. 158–9°), 2-phenylthio-3-aminobenzoic acid (M.P. 148–151°), 2-phenylthio-3-chlorobenzoic acid (M.P. 170–175°), 2-phenylthio-3-chlorobenzyl alcohol (B.P. 155–158°/0.3 torr), 2-phenylthio-3-chloro-benzyl chloride (B.P. 150–7°/0.3 torr), 2-phenylthio-3-chlorobenzyl cyanide (M.P. 58–60°), 2-phenylthio-3-chlorophenylacetic acid (M.P. 129–134°), which is cyclized to 4-chloro-10,11 - dihydrodibenzo(b,f)-thiepin-10-on (M.P. 160–2°), and further via the corresponding 4-chloro-10,11 - dihydrodibenzo(b,f)thiepin - 10 - ol (M.P. 118–120°), and finally by saturation with dry hydrogen chloride converting the latter substance to the desired 4,10-dichloro - 10,11 - dihydrodibenzo(b,f)thiepin, with M.P. 112–114°.

(5) *6 - chloro-10-(4-methylpiperazino)-10,11-dihydrodibenzo(b,f)-thiepin*

A mixture of 12.0 g. of 6,10-dichloro-10,11-dibenzo (b,f)thiepin and 24.0 g. 1-methylpiperazine is heated to 110–120° for 3.5 hours. After cooling down the mixture is stirred up between benzene (200 ml.) and water (200 ml.), and the benzene layer is shaken with 150 ml.

dilute hydrochloric acid (1:2.5), and the hydrochloride eliminated is sucked off. By action of a dilute sodium hydroxide solution upon the latter hydrochloride in suspension in water the base is liberated, which is extracted into benzene. The benzeneous solution is dried with anhydr. potash, and evaporated. There are obtained 4.3 g. of 6-chloro-10-(4-methylpiperazino) - 10,11 - dihydrodibenzene(b,f)thiepin, which on recrystallization from cyclohexane has M.P. 115.5–117.5°. This base is converted to maleste by the action of the equivalent quantity of maleic in ethanol. The maleste has M.P. 163–163.5°.

The starting 6,10 - dichloro-10,11-dihydrodibenzo(b,f) thiepin (M.P. 104–5°) is prepared of 2-chlorothiephenol by an operational sequence via: 2-chlorodiphenylsulfide-2-carboxylic acid (M.P. 178–180°), o-(2-chlorophenylthio)-benzyl alcohol (B.P. 192–194°/0.5 torr), the corresponding benzyl chloride (M.P. 42–44°) and benzyl cyanide (M.P. 70–75°) saponified to 2′-chlorodiphenylsulfide-2-acetic acid (M.P. 99–101°), cyclized to 6-chloro-10,11-dihydrodibenzo(b,f)thiepin-10-on (M.P. 124–125°) the ketone converted to the corresponding alcohol, of which by action of dry HCl the desired substance 6,10-dichloro - 10,11 - dihydrodibenzo(b,f)thiepin, with M.P. 104–105° is obtained.

(6) *7-chloro - 10 - (4-methylpiperazino)-10,11-dihydrodibenzo(b,f)thiepin*

A mixture of 15.0 g. of 7,10-dichloro-10,11-dihydrodibenzo(b,f)thiepin and 30.0 g. of 1-methylpiperazine is heated with stirring to 110–120°. After 3.5 hours heating it is cooled down and processed analogically to the preceding example. There are obtained 5.5 g. of crystalline 7-chloro - 10,11 - dihydrodibenzo(b,f)thiepin, with M.P. 138–139° (ethanol). Of this base, in the conventional manner in ethanol, the salt with maleic acid is prepared. The maleste, on recrystallization from ethanol, has M.P. 183.5–185°.

The starting 7,10-dichloro-10,11-dihydrodibenzo(b,f)–thiepin is prepared of 3-chlorothiophenol by the operational sequence via: 3′-chlorodiphenylsulfide-2-carboxylic acid (M.P. 195–196°), o-(3-chlorophenylthio)benzyl alcohol (B.P. 189–192°/0.5 torr), the corresponding chloride (B.P. 172–5°/0.8 torr) and cyanide (B.P. 186–190°/0.8 torr), 3′-chlorodiphenylsulfide-2-acetic acid (M.P. 100–103°), cyclized to 7-chloro-10,11-dihydrodibenzo(b,f)thiepin-10-on (M.P. 132–133.5°), reduced to the corresponding alcohol (M.P. 95.5–96.5°), of which by saturation with dry HCl the desired substance 7,10-dichloro-10,11-dihydrodibenzo(b,f)thiepin, with M.P. 104–105° (cyclohexane), is obtained.

(7) *1-chloro - 10 - (4-methylpiperazino)-10,11-dihydrodibenzo(b,f)-thiepin*

A mixture of 2.5 g. of 1,10-dichloro-10,11-dihydrodibenzo(b,f)-thiepin and 5 ml. N-methylpiperazine is heated for 3.5 hours to 125–130°. After standing overnight, the reaction mixture is distributed by shaking between 50 ml. benzene and 50 ml. water. The benzeneous solution is separated, and the base contained therein is brought over by shaking into 35 ml. of dilute hydrochloric acid (1:2.5). The little soluble crystalline hydrochloride, which eliminates from the acid aqueous layer is sucked off, suspended in a little water, and decomposed by 15%-NaOH solution. The base liberated is extracted by shaking into benzene, the extract dried with anhydr. sodium sulfate, and evaporated. By crystallization of the residue 0.9 g. of the crystalline base of the desired 1-chloro-10-(4-methylpiperazino)-10,11-dihydrodibenzo(b,f)thiepin is obtained, with M.P. 113–114° (ethanol). By neutralization with maleic acid in ethanolic solution it yields on addition of ether the crystalline maleste, which by heating melts first at 145°, the melt solidifies by further heating, and melts anew at 173° (ethanol-ether).

The starting 1,10-dichloro-10,11-dihydrodibenzo(b,f)-thiepin (M.P. 103.5–104°) is prepared of 6-chloranthranilic acid by the following operational sequence, via: 2-iodo-6-chlorobenzoic acid (unsharp. M.P. 125–145°), 3-chlorodiphenylsulfide-2-carboxylic acid (M.P. 136–7°), the methyl ester thereof (B.P. 183–185°/2 torr), 2-hydroxymethyl - 3 - chlorodiphenylsulfide (B.P. 184°/1.5 torr), 2-chloromethyl-3-chlorodiphenylsulfide (M.P. 71–72°, cyclohexane), 2 - cyano - methyl-3-chlorodiphenylsulfide (M.P. 53–4°), saponified to give 3-chlorodiphenylsulfide-2-acetic acid amide (M.P. 221–2°), cyclized with polyphosphoric acid to 1-chloro-10-oxo-10,11-dihydrodibenzo(b,f)thiepin (M.P. 129–130° ethanol), the latter ketone reduced to 1-chloro-10-hydroxy-10,11-dihydrodibenzo(b,f)thiepin (M.P. 118–121°), which by saturation with dry HCl gives the desired 1,10-dichloro-10,11-dihydrodibenzo(b,f)thiepin, with M.P. 103.5–104°.

(8) *2,8-dichloro-10-(4-methylpiperazino)-10,11-dihydrodibenzo(b,f)thiepin*

A mixture of 1.3 g. of 2,8,10-trichloro-10,11-dihydrodibenzo(b,f)thiepin and 6.5 ml. N-methylpiperazine is left to stand for 48 hours at room temperature, and then heated for 45 min. to 110–120°. After cooling it is distributed by shaking between dilute NaOH solution and benzene, the benzeneous layer is separated, washed with water, and the basic portion thereof is brought over by shaking into dilute hydrochloric acid. By alkalizing the acid solution the base is liberated, which is extracted with ether, the ethereous extract is dried with anhydr. potassium carbonate, and evaporated. The crude base thus obtained is neutralized with maleic acid in ethanol. By addition of ether elimination of the crystalline maleste of 2,8-dichloro-10-(4-methylpiperazino) - 10,11 - dihydrobenzo(b,f)-thiepin, with M.P. 180–181° (ethanol-ether) is achieved.

The starting 2,8,10-trichloro-10,11-dihydrodibenzo(b,f)thiepin is prepared of 2-iodo-3-chlorobenzoic acid by an operational sequence via: 4,4′-dichlorodiphenylsulfide-2-carboxylic acid (M.P. 177–180°) reduced to 2-hydroxymethyl-4-4′-dichlorodiphenylsulfide, (with B.P. 178°/0.25 torr, solidifying to a crystalline substance with M.P. 58–60°), 2-chloromethyl-4,4′-dichlorodiphenylsulfide (B.P. 165°/0.25 torr), the corresponding 2-cyanomethyl derivative (M.P. 72–3°), saponified to give 4,4′-dichlorodiphenylsulfide-2-acetic acid (M.P. 124–6°), cyclized to 2,8-dichloro-10-oxo-10,11-dihydrodibenzo(b,f)thiepin (M.P. 164–5°), reduced to the corresponding -10-hydroxy-derivative (M.P. 120–1°), which by saturation with dry HCl gives the desired crude 2,8,10-trichloro-10,11-dihydrodibenzo(b,f)thiepin (M.P. 115–117°), which is used without further purification because of its unstability, making further purification unadvisable.

(9) *8-fluoro-10-(4-methylpiperazino) - 10,11 - dihydrodibenzo(b,f)thiepin*

A mixture of 6.9 g. of 8-fluoro-10-chloro-10,11-dihydrodibenzo(b,f)thiepin and 15 ml. N-methylpiperazine is heated for 3.5 hours to 125–130°. After cooling (the next day) it is distributed by shaking between 100 ml. benzene and 100 ml. water. The benzeneous layer is washed with water, and the basic product thereof brought over by shaking into 75 ml. of 3 N-HCl. The eliminated, little soluble hydrochloride is sucked off, dissolved in 250 ml. hot water, and the solution is alkalized with 20%-sodium hydroxide. The base eliminated base is extracted with benzene, and the solution dried with sodium sulfate is evaporated. There are obtained 3.8 g. of the desired 8-fluoro-10-(4-methylpiperazine)-10,11 - dihydrodibenzo(b,f)thiepin, yielding by neutralization with maleic acid the crystalline maleste.

The requisite starting 8-fluoro-10-chloro-10,11-dihydrodibenzo(b,f)thiepin is prepared of 2-iodobenzoic acid by the following sequence of operations: The latter acid gives with 4-fluorothiophenol the 4′-fluorodiphenylsulfide-2- carboxylic acid (M.P. 204–5°-ethanol), which is reduced with lithiumaluminium hydride to 2-hydroxymethyl-4′-fluorodiphenylsulfide (M.P. 65–66°), converted to 2-chloromethyl - 4 - fluorodiphenylsulfide (B.P. 150°/0.3 torr), and it is continued via 2-cyanomethyl-4′-fluorodiphenylsulfide (B.P. 150°/0.3 torr), 4′-fluoro-diphenylsulfide-2-acetic acid (M.P. 92–93°-aq. ethanol), cyclized to 8-fluoro-10-oxo-10,11-dihydrodibenzo(b,f)thiepin with M.P. 104–106°-ethanol, the ketone reduced to 8-fluoro-10-hydroxy-10,11-dihydrobenzo(b,f)thiepin (M.P. 77–78°-cyclohexane), which is converted to the desired 8-fluoro-10-chloro-10,11-dihydrodibenzo(b,f)thiepin by the action of anhydr. hydrogen chloride in benzene, in the presence of calcium chloride, similarly to the preceding examples. For further processing this produce is used in crude state.

(10) *8-bromo-10-(4-methylpiperazino) - 10,11 - dihydrodibenzo(b,f)thiepin*

A mixture of 7.5 g. 8-bromo-10-chloro-10,11-dihydrodibenzo(b,f)thiepin with 15 ml. N-methylpiperazine is heated for 3.5 hours to 125–130°. After cooling it is distributed with shaking between benzene and water, the benzeneous layer is washed with water, and the base extracted thereof into 75 ml. 3 N HCl by shaking. The little soluble hydrochloride eliminates, and is sucked off, and then dissolved in 250 ml. hot water, the solution is alkalized with 20%-sodium hydroxide solution, and the base eliminated is extracted with benzene. The benzeneous solution is dried with sodium sulfate and evaporated, the residue (4.0 g.) solidifies crystalline-like, and constitutes the base 8-bromo-10-(4-methylpiperazino)-10,11-dihydrodibenzo(b,f)thiepin, with M.P. 118–119° (aq. ethanol). By neutralization with maleic acid in ethanol with addition of ether, the crystalline maleste with M.P. 203–204° (ethanol) is prepared.

The requisite starting 8-bromo-10-chloro-10,11-dihydrodibenzo(b,f)thiepin is prepared of 2-iodobenzoic acid by the following sequence of operations: The latter acid gives with 4-bromothiophenol the 4′-bromodiphenylsulfide-2-carboxylic acid (M.P. 250°-acetic acid), which is reduced similarly to the preceding examples to 2-hydroxymethyl-4′-bromodiphenylsulfide (B.P. 180°/0.5 torr, and M.P. 38°), and it is continued via the 2-chloromethyl-derivative (B.P. 162°/0.25 torr and M.P. 52°) and 2-cyanomethyl derivative (M.P. 82°-ethanol) to 4′-bromodiphenylsulfide-2-acetic acid (M.P. 124–125°-benzene), which is cyclized in the usual manner to give 8-bromo-10-oxo-10,11-dihydrodibenz(b,f)thiepin (M.P. 113°-ethanol), reduced to give the 10-hydroxy derivative with M.P. 107° (cyclohexane), which by saturation with anhydr. hydrogen chloride gives in an almost theoretical yield the desired 8-bromo-10-chloro-10,11-dihydrobenzo-(b,f)thiepin (M.P. 105–106°-cyclohexane).

We claim:
1. A substance selected from the group consisting of compounds of the formula

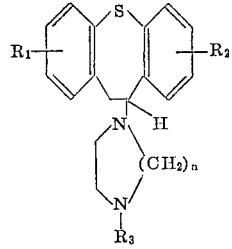

wherein $R_1$ and $R_2$ are hydrogen or halogen, at least one of $R_1$ and $R_2$ being halogen, $R_3$ is alkyl or hydroxyalkyl, said alkyl and hydroxyalkyl having 1–6 carbon atoms, $n$ being 2 or 3, and salts of compounds of said formula with a physiologically tolerated acid.

2. A substance as defined in claim 1, wherein said physiologically tolerated acid is selected from the group consisting of maleic acid and hydrochloric acid.

3. A substance as defined in claim 1, and selected from the group consisting of 8-chloro-10-(4-methylpiperazino)-10,11-dihydrodibenzo(b,f)thiepin and the anhydrous dihydrochloride thereof.

4. A substance as defined in claim 1, and selected from the group consisting of 8-fluoro-10-(4-methylpiperazino)-10,11-dihydrodibenzo(b,f)thiepin and the maleate thereof.

5. A substance as defined in claim 1 and selected from the group consisting of 8-bromo-10-(4-methylpiperazino)-10,11-dihydrodibenzo(b,f)thiepin and the maleate thereof.

References Cited

UNITED STATES PATENTS

| 3,100,207 | 8/1963 | Zirkle | 260—268 |
| 3,262,934 | 7/1966 | Cusic et al. | 260—268 |

OTHER REFERENCES

Kimoto et al.: J. Pharm. Soc. of Japan, vol. 77 (1957), pp. 625–55. RS1. p. 45.

Kawai: Chemical Abstracts, vol. 55 (1961), p. 21, 374 g.

HENRY R. JILES, *Primary Examiner.*